United States Patent
Hagimoto et al.

[11] 3,787,198
[45] Jan. 22, 1974

[54] HERBICIDAL COMPOSITIONS CONTAINING VARIOUS BENZYLTHIODIAZOLES AND TRIAZINES

[75] Inventors: Hiroshi Hagimoto; Toshiharu Arai; Harutoshi Yoshikawa; Mitsuo Watanabe, all of Kyoto; Yoshiyuki Okada, Osaka, all of Japan

[73] Assignee: Takeda Chemical Industries, Ltd., Osaka, Japan

[22] Filed: Mar. 31, 1970

[21] Appl. No.: 24,386

[30] Foreign Application Priority Data
July 1, 1969 Japan.................. 44-51950

[52] U.S. Cl............................ 71/93, 71/90, 71/92, 71/108, 71/109, 71/110, 71/116, 71/117, 71/118, 71/120
[51] Int. Cl.............................. A01n 9/22
[58] Field of Search................... 71/90, 92, 93

[56] References Cited
UNITED STATES PATENTS
3,554,732   1/1971   Priola et al. ................... 71/93

Primary Examiner—Lewis Gotts
Assistant Examiner—Catherine L. Mills
Attorney, Agent, or Firm—Wenderoth, Lind and Ponack

[57] ABSTRACT

Herbicidal compositions comprise a compound of the formula

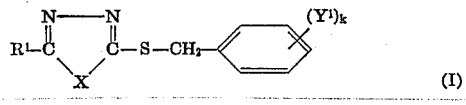

wherein $R^1$ is hydrogen or alkyl, X is oxygen or sulfur, $Y^1$ is halogen, lower alkyl, lower alkoxy or nitro, and $k$ is zero or an integer from 1 to 5, or such compound in combination with one or more of salt or ester thereof which is represented by the general formula:

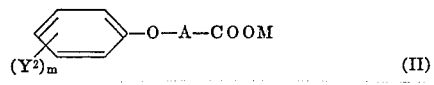

wherein A is lower alkylene, $Y^2$ is chlorine or methyl, M is hydrogen, alkali metal, lower alkyl or lower alkenyl, and $m$ is zero or an integer from 1 to 5; a 3,4-dichloroanilide which is represented by the general formula:

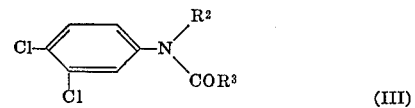

wherein $R^2$ and $R^3$ respectively are hydrogen or lower alkyl; a 1,3,5-triazine compound which is represented by the general formula:

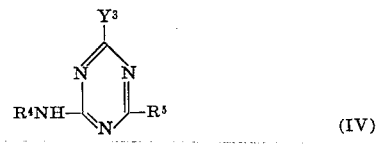

wherein $Y^3$ is chlorine or lower alkylthio, $R^4$ is lower alkyl, and $R^5$ is azido or lower alkylamino, or a phenylurea compound which is represented by the general formula:

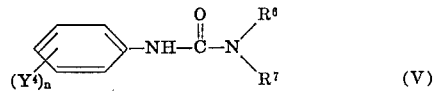

wherein $Y^4$ is halogen or halogen-substituted lower alkyl, $R^6$ and $R^7$ respectively are lower alkyl or lower alkoxy, and $n$ is zero, 1 or 2.

4 Claims, No Drawings

HERBICIDAL COMPOSITIONS CONTAINING VARIOUS BENZYLTHIODIAZOLES AND TRIAZINES

This invention relates to new herbicides. More particularly, the invention relates to herbicides containing one or more of 2-benzylthio-1,3,4-oxa(or thia)diazoles represented by the general formula:

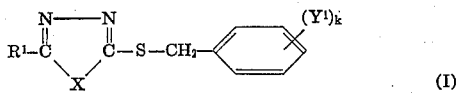

(I)

wherein $R^1$ is hydrogen or alkyl, X is oxygen or sulfur, $Y^1$ is halogen, lower alkyl, lower alkoxy or nitro, and $k$ is zero or an integer from 1 to 5.

It has unexpectedly been discovered that 2-benzylthio-1,3,4-oxa (or thia)diazole compounds of the general formula (I) are capable of destroying both dicotyledonous and monocotyledonous weeds without causing any injurious effect upon a wide range of crops such as paddy rice plants, corn, soy beans, ground nuts, radish, eggplants, sugar beats, tomatoes and carrots and that they are particularly phytotoxic to such monocotyledonous weeds as *Echinochloa crusgalli* (L.) Beauv., *Digitaria adscendens* Henr., *Cyperus difformis* L., *Eleocharis acicularis* Roem. et Schult. and *Avena fatua* L.

It has also been discovered that when a compound represented by the formula (I) is used as herbicide in combination with one or more of a phenoxy-fatty acid or salt or ester thereof which is represented by the general formula:

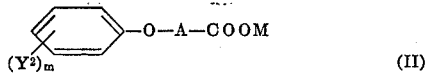

(II)

wherein A is lower alkylene, $Y^2$ is chlorine or methyl, M is hydrogen, alkali metal, lower alkyl or lower alkenyl, and $m$ is zero or an integer from 1 to 5; a 3,4-dichloroanilide which is represented by the general formula:

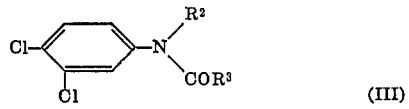

(III)

wherein $R^2$ and $R^3$ respectively are hydrogen or lower alkyl; a 1,3,5-triazine compound which is represented by the general formula:

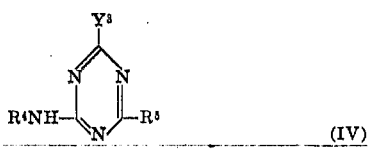

(IV)

wherein $Y^3$ is chlorine or lower alkylthio, $R^4$ is lower alkyl, and $R^5$ is azido or lower alkylamino, or a phenylurea compound which is represented by the general formula:

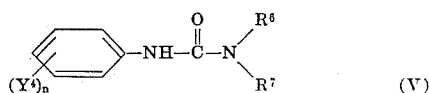

(V)

wherein $Y^4$ is halogen or halogen-substituted lower alkyl, $R^6$ and $R^7$ respectively are lower alkyl or lower alkoxy, and $n$ is zero, 1 or 2, each of the compounds (II), (III), (IV), (V), acts as a strong synergist for the compounds (I), the resulting herbicidal effect being of the respective compounds.

As regards the above-mentioned formulas (I) to (V), alkyl represented by $R^1$ is exemplified by methyl, ethyl, n-propyl, isopropyl, n-butyl, isobutyl, sec.-butyl, n-amyl, n-hexyl, n-heptyl, n-octyl, n-nonyl and the like, lower alkyl represented by M, $Y^1$, $R^2$, $R^3$, $R^4$, $R^6$ and $R^7$ is exemplified by methyl, ethyl, n-propyl, isopropyl, n-butyl, isobutyl, sec.-butyl, n-amyl, isoamyl and the like, halogen represented by $Y^1$ and $Y^4$ is exemplified by chlorine, bromine, fluorine and the like, lower alkoxy represented by $Y^1$, $R^6$ and $R^7$ is exemplified by methoxy, ethoxy, n-propoxy, isopropoxy, n-butoxy, isobutoxy, sec.-butoxy, tert.-butoxy, n-pentoxy, isopentoxy and the like, lower alkylene represented by A is exemplified by methylene, ethylene, propylene, 1-methylethylene, butylene, 1-methylpropylene, 2-methylpropylene, 1-ethylethylene, pentylene and the like, lower alkylamino represented by $R^5$ is exemplified by methylamino, ethylamino, n-propylamino, isopropylamino, n-butylamino, isobutylamino, sec.-butylamino, tert.-butylamino, n-pentylamino, isopentylamino and the like, lower alkylthio represented by $Y^3$ is exemplified by methylthio, ethylthio, n-propylthio, isopropylthio, n-butylthio, isobutylthio, sec.-butylthio, tert.-butylthio, n-amylthio, isoamylthio and the like, halogen substituted lower alkyl represented by $Y^4$ is exemplified by methyl, ethyl, n-propyl, isopropyl, n-butyl, isobutyl, sec.-butyl, tert.-butyl, n-amyl, isoamyl, substituted by one or more halogen atom, e.g., chlorine, bromine and fluorine, alkali metal represented by M is exemplified by sodium, potassium and the like, and lower alkenyl represented by M is exemplified by vinyl, allyl, 1-butenyl, 2-butenyl, 3-butenyl and the like.

Some of the 2-benzylthio-1,3,4-oxa(or thia)diazoles represented by the general formula (I), accompanied by their melting points (mp) or boiling points (bp), are shown below.

1. 2-(benzylthio)-5-methyl-1,3,4-oxadiazole, $bp_3$ 139°–140° C.
2. 2-(2-chlorobenzylthio)-5-methyl-1,3,4-oxadiazole, $bp_2$ 158°–159° C.
3. 2-(2,4-dichlorobenzylthio)-5-methyl-1,3,4-oxadiazole, $bp_2$ 169°–170° C.
4. 2-(2,6-dichlorobenzylthio)-5-methyl-1,3,4-oxadiazole, mp. 79°–80° C.
5. 2-(2-bromobenzylthio)-5-methyl-1,3,4-oxadiazole, $bp_{0.6}$ 157°–160° C.
6. 2-(4-bromobenzylthio)-5-methyl-1,3,4-oxadiazole, mp. 73°–74° C.
7. 2-(2-nitrobenzylthio)-5-methyl-1,3,4-oxadiazole, mp. 61°–62° C.
8. 2-(3-nitro-4-methoxybenzylthio)-5-methyl-1,3,4-oxadiazole, mp. 73°–74° C.
9. 2-(2-methylbenzylthio)-5-methyl-1,3,4-oxadiazole, $bp_2$ 161°–168° C.

10. 2-(3-methylbenzylthio)-5-methyl-1,3,4-oxadiazole, bp$_2$ 161°–168° C.
11. 2-(4-methylbenzylthio)-5-methyl-1,3,4-oxadiazole, bp$_1$ 161°–167° C.
12. 2-(2,5-dimethylbenzylthio)-5-methyl-1,3,4-oxadiazole, bp$_1$ 165°–170° C.
13. 2-benzylthio-5-ethyl-1,3,4-oxadiazole, bp$_3$ 147° C.
14. 2-(2-chlorobenzylthio)-5-ethyl-1,3,4-oxadiazole, bp$_{1.5}$ 166°–167° C.
15. 2-(4-chlorobenzylthio)-5-ethyl-1,3,4-oxadiazole, bp$_{1.5}$ 170°–175° C.
16. 2-(2,4-dichlorobenzylthio)-5-ethyl-1,3,4-oxadiazole, bp$_{1.5}$ 180°–188° C.
17. 2-benzylthio-5-(n-propyl)-1,3,4-oxadiazole, bp$_{0.2}$ 142°–147° C.
18. 2-(2-chlorobenzylthio)-5-(n-propyl)-1,3,4-oxadiazole, bp$_{0.3}$ 164°–169° C.
19. 2-(4-chlorobenzylthio)-5-(n-propyl)-1,3,4-oxadiazole, bp$_{0.3}$ 170°–175° C.
20. 2-(2,4-dichlorobenzylthio)-5-(n-propyl)-1,3,4-oxadiazole, bp$_{0.3}$ 165°–172° C.
21. 2-(2-chlorobenzylthio)-5-isopropyl-1,3,4-oxadiazole, bp$_{0.6}$ 155°–159° C.
22. 2-(4-chlorobenzylthio)-5-isopropyl-1,3,4-oxadiazole, bp$_{0.6}$ 157°–162° C.
23. 2-benzylthio-5-isobutyl-1,3,4-oxadiazole, bp$_1$ 151°–153° C.
24. 2-(2-chlorobenzylthio)-5-isobuthy-1,3,4-oxadiazole, bp$_{0.9}$ 165°–167° C.
25. 2-(4-chlorobenzylthio)-5-isobutyl-1,3,4-oxadiazole, bp$_{0.9}$ 171°–173° C.
26. 2-(3-nitrobenzylthio)-5-isobutyl-1,3,4-oxadiazole, bp$_4$ 208°–210° C.
27. 2-benzylthio-5-(n-pentyl)-1,3,4-oxadiazole, bp$_1$ 169°–170° C.
28. 2-(2-chlorobenzylthio)-5-(n-pentyl)-1,3,4-oxadiazole, bp$_3$ 185°–190° C.
29. 2-(4-chlorobenzylthio)-5-(n-pentyl)-1,3,4-oxadiazole, mp 36° C.
30. 2-benzylthio-5-(n-heptyl)-1,3,4-oxadiazole, bp$_{0.9}$ 185°–190° C.
31. 2-(2-chlorobenzylthio)-5-(n-heptyl)-1,3,4-oxadiazole, bp$_{0.9}$ 195°–200° C.
32. 2-(4-chlorobenzylthio)-5-(n-heptyl)-1,3,4-oxadiazole, mp 43°–44° C.
33. 2-benzylthio-1,3,4-thiadiazole, bp$_1$ 161°–162° C.
34. 2-benzylthio-5-methyl-1,3,4-thiadiazole, mp 62°–63° C.
35. 2-(2-chlorobenzylthio)-5-methyl-1,3,4-thiadiazole, bp$_3$ 170°–175° C.
36. 2-(4-chlorobenzylthio)-5-methyl-1,3,4-thiadiazole, mp 65°–67° C.
37. 2-(2,4-dichlorobenzylthio)-5-methyl-1,3,4-thiadiazole, mp 59°–60° C.
38. 2-(2-bromobenzylthio)-5-methyl-1,3,4-thiadiazole, bp$_3$ 193°–195° C.
39. 2-(4-bromobenzylthio)-5-methyl-1,3,4-thiadiazole, mp 69°–70° C.
40. 2-(2,5-dimethylbenzylthio)-5-methyl-1,3,4-thiadiazole, bp$_3$ 185°–187° C.
41. 2-benzylthio-5-ethyl-1,3,4-thiadiazole, bp$_{0.6}$ 154°–159° C.
42. 2-(2-chlorobenzylthio)-5-ethyl-1,3,4-thiadiazole, bp$_{0.3}$ 164°–168° C.
43. 2-(4-chlorobenzylthio)-5-ethyl-1,3,4-thiadiazole, bp$_1$ 175°–179° C.
44. 2-(2,4-dichlorobenzylthio)-5-ethyl-1,3,4-thiadiazole, mp 45°–46° C.
45. 2-benzylthio-5-(n-propyl)-1,3,4-thiadiazole, bp$_{0.5}$ 165°–170° C.
46. 2-(2-chlorobenzylthio)-5-(n-propyl)-1,3,4-thiadiazole, bp$_{0.5}$ 185°–190° C.
47. 2-(2,4-dichlorobenzylthio)-5-(n-propyl)-1,3,4-thiadiazole, bp$_{0.5}$ 205°–210° C.
48. 2-benzylthio-5-isopropyl-1,3,4-thiadiazole, bp$_{0.4}$ 167°–171° C.
49. 2-(2-chlorobenzylthio)-5-isopropyl-1,3,4-thiadiazole, bp$_{0.5}$ 178°–179° C.
50. 2-(4-chlorobenzylthio)-5-isopropyl-1,3,4-thiadiazole, mp 62°–64° C.
51. 2-benzylthio-5-isobutyl-1,3,4-thiadiazole, bp$_{0.5}$ 162°–165° C.
52. 2-(2-chlorobenzylthio)-5-isobutyl-1,3,4-thiadiazole, bp$_{0.6}$ 175°–177° C.
53. 2-(4-chlorobenzylthio)-5-isobutyl-1,3,4-thiadiazole, bp$_{0.5}$ 177°–178° C.
54. 2-(2,4-dichlorobenzylthio)-5-(n-nonyl)-1,3,4-thiadiazole, bp$_{0.5}$ 210°–220° C.

2-Benzylthio-1,3,4-thiadiazole represented by the general formula (I) is easily prepared, for example, by reacting a dithiocarbamic acid benzyl ester of the following general formula:

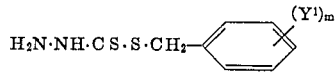

wherein $Y^1$ and m are as defined above with an aliphatic carbonyl chloride represented by the general formula:

wherein $R^1$ is as defined above, preferably, under heating either in the presence or absence of an inert solvent such as benzene, toluene or xylene. 2-Benzylthio-1,3,4-oxadiazole represented by the general formula (I) also is easily prepared by, for example, reacting a 2-substituted -$\Delta^2$-1,3,4-oxadiazoline-5-thione compound of the following general formula:

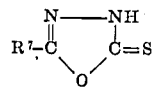

wherein $R^1$ is as defined above with a compound of the following general formula:

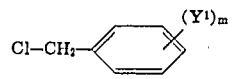

wherein $Y^1$ and m are as defined above, preferably, under heating, in the presence of a deacidifying agent such as triethylamine or sodium hydroxide.

The compound 2-(2-chlorobenzylthio)-5-(n-propyl)-1,3,4-oxadiazole, which is one of the compounds represented by the formula (I), is produced, for example, in the following manner:

To 4.3 parts by weight of 2-(n-propyl)-$\Delta^2$-1,3,4-oxadiazoline-5-thion dissolved in 50 parts by volume of ethanol is added 1.2 part by weight of sodium hydroxide dissolved in 5 parts by volume of water, followed by the addition of 4.8 parts by weight of o-chlorobenzyl chloride. The mixture is heated at 70°–80° C on a water bath for 2 hours. Sodium chloride precipitated is filtered off and ethanol is distilled off from mother liquid, whereby an oily substance is obtained. The oily substance is dissolved in 50 parts by volume of benzene and then washed with water. After elimination of the benzene by means of distillation, the residue is distilled under reduced pressure to give 7.0 parts by weight of 2-(2-chlorobenzylthio)-5-(n-propyl)-1,3,4-oxadiazole which is pale-yellowish oily substance. $bp_{0.3}$ 164°–169° C.

The following are typical compounds of the general formula (II):

A. 2,4-dichlorophenoxyacetic acid ethyl ester
B. 2-methyl-4-chlorophenoxyacetic acid ethyl etser
C. 2-methyl-4-chlorophenoxyacetic acid allyl ester
D. α-(2-methyl-4-chlorophenoxy)-propionic acid
E. 2,4,5-trichlorophenoxyacetic acid ethyl ester
F. 2,4-dichlorophenoxybutyric acid ethyl ester The following are typical compounds represented by the above general formula (III):

A'. 3,4-dichloropropionanilide
B'. N-methyl-3,4-dichloropropionanilide
C'. 3,4-dichloroacetanilide
D'. N-methyl-3,4-dichloroacetanilide
E'. N-ethyl-3,4-dichloropropionanilide The following are typical compounds of general formula (IV):

a. 2-chloro-4,6-bis(ethylamino)-1,3,5-triazine
b. 2-chloro-4-ethylamino-6-isopropylamino-1,3,5-triazine
c. 2-chloro-4,6-bis(isopropylamino)-1,3,5-triazine
d. 2-methylthio-4,6-bis(ethylamino)-1,3,5-triazine
e. 2-methylthio-4,6-bis(isopropylamino)-1,3,5-triazine
f. 2-methylthio-4-methylamino-6-isopropylamino-1,3,5-triazine
g. 2-methylthio-4-ethylamino-6-isopropylamino-1,3,5-triazine
h. 2-methylthio-4-azido-6-(1-cyanomethylethylamino)-1,3,5-triazine The following are typical compounds of general formula (V):

a'. 3-phenyl-1,1-dimethylurea
b'. 3-(4chlorophenyl)-1,1-dimethylurea
c'. 3-(3,4-dibromophenyl)-1,1-dimethylurea
d'. 3-(3,4-dichlorophenyl)-1,1-dimethylurea
e'. 3-(3-trifluoromethylphenyl)-1,1-dimethylurea
f'. 3-(4-chlorophenyl)-1-methyl-1-methoxyurea
g'. 3-(3,4-dichlorophenyl)-1-methyl-1-methoxyurea
h'. 3-(4-bromophenyl)-1-methyl-1-methoxyurea
i'. 3-(3-chloro-4-bromophenyl)-1-methyl-1-methoxyurea
j'. 3-(3-trifluoromethylphenyl)-1-methyl-1-methoxyurea
k'. 3-(3,4-dichlorophenyl)-1-methyl-1-butylurea When a compound represented by the formula (I) is used as herbicides in combination with one or more of the compounds represented by the formula (II), (III), (IV) and (V), the preferred ratios of a compound (I) to one or more of the compounds (II), (III), (IV) and (V) is 1: 0.1 – 1.0.

Broadly speaking, the compounds used in this invention are herbicidically effective and are employed at levels of from about 1 kg per hectare to about 10 kgs per hectare for general weed control. For selective weed control in crops, rates of 2 kgs per hectare to 6 kgs per hectare will generally be used and in pre-emergence treatments 1 kg per hectare to 5 kgs per hectare may for example be used.

To put the herbicides of this invention to use, the composition is first diluted to a suitable concentration and applied either to the soil as a pre-emergence herbicide or to the standing weeds for post-emergence treatments. To control hydrophytes, the composition may be applied either directly to the weeds or to the water where the weeds grow, or to both. When directly applied to weeds, the composition according to this invention acts as a powerful contact poison to suppress growth of the weed or completely destroy the weed. Even when the herbicidal composition is applied to the locus of the weed, not in direct contact therewith, the weed suffers from a considerable decay or growth suppression. Furthermore, in so far as it is properly used, the compositions according to this invention exhibit excellent selectivity.

Depending upon the purpose of application, the herbicides of this invention can be applied in various manners. Thus, one or more of the 2-benzylthio-1,3,4-oxa(thia)diazoles of the general formula (I), which may be mixed with a member selected from the group consisting of phenoxy fatty acid compounds represented by the general formula (II), 3,4-dichloroanilide compounds represented by the general formula (III), 1,3,5-triazine compounds represented by the general formula (IV) and phenylurea compounds represented by the general formula (V) and a mixture thereof, is directly applied as such or used otherwise. The above compounds are dissolved or dispersed in a suitable liquid vehicle (e.g., solvent) or mixed with a suitable ointment base or solid carrier (e.g., diluent or filler) or absorbed thereon, with or without the addition of an emulsifier, dispersing agent, suspension aid, extender, penetrating agent, wetting agent, thickner, stabilizer and the like, and the resulting oil solution, emulsion, wettable powder, dust, tablet, granule, aerosol or ointment, for instance, may be applied.

The proper proportion of the effective ingredients in the herbicide, though it depends upon the purpose in application, lies somewhere between about 1 to about 90 percent for such preparations as emulsifiable solutions and wettable powders, and between about 0.1 to about 10 percent for oil, dusts and other forms. Those concentration ranges may be somewhat modified to suit the purpose of application. Regarding the emulsions, wettable powders and some other forms, they are preferably diluted with water, for instance, to a suitable concentration (e.g., 1,000 – 10,000 times) before application.

The solvents which can be used in the composition of this invention include, among others, water, various alcohols (e.g., methanol, ethanol, ethylene glycol, etc.), ketones (e.g., acetone, methyl ethyl ketone, etc.), ethers (e.g., dioxane, tetrahydrofuran, cellosolve, etc.), aliphatic hydrocarbons (e.g., gasoline, kerosene, fuel oil, machine oil, etc.). aromatic hydrocarbons (e.g., benzene toluene, xylene, solvent naphtha, methyl naphthalene, etc.), halogenated hydrocarbons (e.g., chloroform, carbon tetrachloride, etc.) acid amides (e.g., dimethylformamide etc.), esters (e.g., ethyl acetate, butyl acetate, glycerin fatty acid esters, etc.), nitriles (e.g., acetonitrile etc.) and the like. Those solvents may be employed either singly or in combination.

The aforesaid diluent or filler means any of such materials as vegetable powders (e.g., soybean powder, tobacco leaf powder, wheat flour, saw dust, etc.), mineral powders (e.g., kaoline, bentonite, clay, pyrophyllite powder and other talcs, diatomite, mica powder and other siliceous materials), alumina, sulfur powder, activated carbon and the like. Those materials may be used either singly or in combination.

The ointment base may be chosen from among polyethylene glycol, pectin, glyceryl monostearate and other polyhydric alcohol esters of higher fatty acids, various cellulose derivatives such as methyl cellulose etc., sodium alginate, bentonite, higher alcohols, polyhydric alcohols, e.g., glycerine, vaseline, white vaseline, liquid paraffin, lard, various vegetable oils, lanolin, lanolin anhydricum, hydrogenated oil, waxes and various resins. Those materials may be employed either singly or in combination and with or without the addition of surfactants and other additives.

Regarding the surfactants which can be used as the aforesaid emulsifier, extender, penetrating agent, dispersing agent, etc., use can be made, as required, of a wide variety of surface active agents, inclusive of soaps, higher alkyl sulfates, alkyl-sulfonates, alkylarylsulfonates, quaternary ammonium salts, oxyalkylamines, polyalkylene-oxide and anhydrosorbitol surfactants, etc. For the same purpose, it is also possible to employ, as required, such other materials as casein, gelatin, starch, alginic acid, agar, polyvinyl alcohol, carboxymethyl cellulose, terpene oil, rice bran oil, bentonite and the like.

The compositions which can thus be obtained may be further mixed with other herbicides, plant growth regulators such as various germicides (e.g., copper germicides, organic chlorine germicides, organic sulfur germicides, phenolic germicides, etc.), insecticides (organic chlorine insecticides, organic phosphorus insecticides, natural insecticides, etc.), ascaricides, synergists, attractants, repellents, perfumes and fertilizers.

The following experimental data are given to illustrate the weed control effects of the herbicidal compositions of this invention.

In the following description, the compounds (I) (II), (III), (IV) and (V) correspond to the aforementioned compounds (I), (II), (III), (IV) and (V), respectively, and the compounds (1), (2), (3), etc., (A), (B), (C), etc., (A'), (B'), (C'), etc., (a), (b), (c), etc. and (a'), (b'), (c'), etc. mean the compounds enumerated under like numerals in the listings of the compounds (I), (II), (III), (IV) and (V) respectively. It is also understood that g/A means the number of grams of each test compound per acre.

EXPERIMENT 1.

Clay pots with 12 cm diameter were sown with 100 seeds of *Oryza sativa* L. (rice), *Echinochloa crus-galli* (L.) Beauv. var. *oryzicola* Ohwi, *Ludwigia prostrata* Roxb., *Digitaria adscendens* Henr. and *Amaranthus retroflexus* respectively, and the emerged seedlings were thinned to leave 10 plants each. The herbicidal preparations were applied at the second or third leaf stage of each plant. The spray solution was prepared by dissolving predetermined amounts (g/A) of compounds (I) in 50 cc. each of acetone, followed by the addition of 10g. polyoxysorbitan monolaurate to each solution, which was then made up with water to a total quantity of 10 litres. (The Echinochloa and Ludwigia were cultivated under 1 cm deep water, while Digitaria and Amaranthus were cultivated under upland field conditions.) After 10 days, the degree of injury sustained by each plant was investigated. The degrees of injury are expressed in the following indices of injury.

INDICES OF INJURY
0: No injury at all
1: Slight injury (Fresh weight did not decrease to more than 60 percent of the control)
2: Severe injury (Fresh weight decreased to less than 60 percent of the control)
3: Complete decay The results are set forth in Table 1.

Table 1

(Post-emergence treatment)

| Compound (I) No. | Dosage (g/A) | Transplanted rice | Echinochloa | Ludwigia | Digitaria | Amaranthus |
|---|---|---|---|---|---|---|
| (1) | 50 | 0 | 2 | 1 | 2 | 1 |
|  | 100 | 1 | 3 | 2 | 3 | 3 |
| (2) | 50 | 1 | 1 | 2 | 2 | 2 |
|  | 100 | 2 | 2 | 3 | 3 | 2 |
| (3) | 50 | 1 | 3 | 2 | 2 | 1 |
|  | 100 | 2 | 3 | 3 | 3 | 3 |
| (4) | 50 | 1 | 2 | 1 | 2 | 2 |
|  | 100 | 2 | 3 | 2 | 3 | 3 |
| (5) | 50 | 1 | 2 | 1 | 2 | 2 |
|  | 100 | 2 | 3 | 2 | 3 | 3 |
| (6) | 50 | 0 | 2 | 1 | 2 | 2 |
|  | 100 | 1 | 3 | 2 | 3 | 3 |
| (7) | 50 | 0 | 2 | 1 | 2 | 2 |
|  | 100 | 1 | 3 | 2 | 3 | 3 |
| (8) | 50 | 0 | 2 | 1 | 2 | 1 |
|  | 100 | 1 | 3 | 2 | 3 | 2 |
| (9) | 50 | 0 | 2 | 1 | 2 | 1 |
|  | 100 | 1 | 3 | 2 | 3 | 2 |
| (10) | 50 | 0 | 1 | 1 | 1 | 1 |
|  | 100 | 1 | 2 | 2 | 2 | 2 |
| (11) | 50 | 0 | 2 | 1 | 2 | 1 |
|  | 100 | 1 | 3 | 2 | 3 | 2 |
| (12) | 50 | 0 | 2 | 2 | 2 | 2 |
|  | 100 | 1 | 3 | 3 | 3 | 3 |
| (13) | 50 | 0 | 2 | 1 | 2 | 2 |
|  | 100 | 1 | 3 | 2 | 3 | 3 |

Table 1—Continued (Post-emergence treatment)

| Compound (I) No. | Dosage (g/A) | Transplanted rice | Echinochloa | Ludwigia | Digitaria | Amaranthus |
|---|---|---|---|---|---|---|
| (14) | 50 | 1 | 1 | 2 | 2 | 2 |
|  | 100 | 2 | 2 | 3 | 3 | 3 |
| (15) | 50 | 1 | 2 | 2 | 2 | 1 |
|  | 100 | 2 | 3 | 3 | 3 | 3 |
| (16) | 50 | 0 | 2 | 2 | 2 | 2 |
|  | 100 | 1 | 3 | 3 | 3 | 3 |
| (17) | 50 | 0 | 1 | 1 | 2 | 1 |
|  | 100 | 0 | 3 | 2 | 3 | 2 |
| (18) | 50 | 0 | 1 | 1 | 2 | 1 |
|  | 100 | 0 | 3 | 2 | 3 | 2 |
| (19) | 50 | 0 | 2 | 2 | 3 | 2 |
|  | 100 | 1 | 3 | 3 | 3 | 3 |
| (20) | 50 | 0 | 2 | 1 | 3 | 2 |
|  | 100 | 1 | 3 | 2 | 3 | 3 |
| (21) | 50 | 0 | 3 | 1 | 2 | 1 |
|  | 100 | 1 | 3 | 3 | 3 | 2 |
| (22) | 50 | 0 | 2 | 1 | 2 | 1 |
|  | 100 | 1 | 3 | 2 | 3 | 2 |
| (23) | 50 | 0 | 2 | 1 | 2 | 1 |
|  | 100 | 1 | 3 | 2 | 3 | 2 |
| (24) | 50 | 0 | 3 | 2 | 3 | 2 |
|  | 100 | 2 | 3 | 3 | 3 | 3 |
| (25) | 50 | 0 | 3 | 2 | 3 | 3 |
|  | 100 | 1 | 3 | 3 | 3 | 3 |
| (26) | 50 | 0 | 2 | 1 | 2 | 1 |
|  | 100 | 1 | 3 | 2 | 3 | 2 |
| (27) | 50 | 1 | 2 | 1 | 2 | 1 |
|  | 100 | 2 | 3 | 2 | 3 | 2 |
| (28) | 50 | 1 | 2 | 1 | 2 | 1 |
|  | 100 | 2 | 3 | 2 | 3 | 2 |
| (29) | 50 | 1 | 3 | 2 | 3 | 1 |
|  | 100 | 2 | 3 | 3 | 3 | 2 |
| (30) | 50 | 1 | 2 | 1 | 2 | 1 |
|  | 100 | 2 | 3 | 2 | 3 | 2 |
| (31) | 50 | 1 | 3 | 2 | 3 | 2 |
|  | 100 | 2 | 3 | 3 | 3 | 3 |
| (32) | 50 | 1 | 2 | 1 | 2 | 1 |
|  | 100 | 2 | 3 | 2 | 3 | 2 |
| (33) | 50 | 1 | 1 | 0 | 1 | 0 |
|  | 100 | 2 | 3 | 2 | 2 | 1 |
| (34) | 50 | 1 | 1 | 0 | 2 | 1 |
|  | 100 | 2 | 3 | 2 | 2 | 2 |
| (35) | 50 | 1 | 2 | 0 | 2 | 1 |
|  | 100 | 2 | 3 | 2 | 3 | 2 |
| (36) | 50 | 1 | 1 | 0 | 1 | 0 |
|  | 100 | 1 | 2 | 1 | 3 | 2 |
| (37) | 50 | 0 | 0 | 0 | 1 | 0 |
|  | 100 | 1 | 2 | 2 | 2 | 1 |
| (38) | 50 | 1 | 2 | 1 | 2 | 1 |
|  | 100 | 2 | 3 | 2 | 3 | 2 |
| (39) | 50 | 0 | 2 | 2 | 2 | 2 |
|  | 100 | 1 | 3 | 3 | 3 | 3 |
| (40) | 50 | 1 | 2 | 2 | 2 | 2 |
|  | 100 | 2 | 3 | 3 | 3 | 3 |
| (41) | 50 | 0 | 2 | 1 | 2 | 2 |
|  | 100 | 2 | 3 | 3 | 3 | 3 |
| (42) | 50 | 0 | 1 | 1 | 2 | 2 |
|  | 100 | 1 | 2 | 2 | 3 | 3 |
| (43) | 50 | 1 | 1 | 1 | 1 | 2 |
|  | 100 | 2 | 3 | 3 | 2 | 3 |
| (44) | 50 | 0 | 1 | 1 | 2 | 1 |
|  | 100 | 1 | 2 | 2 | 3 | 2 |
| (45) | 50 | 1 | 1 | 1 | 1 | 3 |
|  | 100 | 2 | 2 | 2 | 2 | 3 |
| (46) | 50 | 0 | 0 | 1 | 1 | 1 |
|  | 100 | 0 | 2 | 2 | 2 | 2 |
| (47) | 50 | 0 | 2 | 1 | 1 | 1 |
|  | 100 | 0 | 3 | 2 | 2 | 2 |
| (48) | 50 | 0 | 2 | 1 | 2 | 2 |
|  | 100 | 1 | 3 | 2 | 3 | 3 |
| (49) | 50 | 0 | 2 | 0 | 2 | 2 |
|  | 100 | 0 | 3 | 3 | 3 | 3 |
| (50) | 50 | 0 | 1 | 1 | 2 | 1 |
|  | 100 | 1 | 2 | 2 | 3 | 2 |
| (51) | 50 | 0 | 1 | 0 | 2 | 2 |
|  | 100 | 0 | 2 | 2 | 3 | 3 |
| (52) | 50 | 0 | 2 | 0 | 2 | 2 |
|  | 100 | 0 | 3 | 2 | 3 | 3 |
| (53) | 50 | 0 | 1 | 1 | 2 | 2 |
|  | 100 | 0 | 3 | 3 | 3 | 3 |
| (54) | 50 | 0 | 0 | 0 | 0 | 1 |
|  | 100 | 0 | 1 | 2 | 2 | 3 |

EXPERIMENT 2

Clay pots with 12 cm diameter were sown with rice, *Echinochloa crus-galli* (L.) Beauv., *Ludwigia prostrata* Roxb., *Digitaria adscendens* Henr. and *Amaranthus retroflexus* L., respectively, 100 seeds of each plant per pot, and the spray solutions were sprayed evenly over the soil surfaces. The herbicidal preparations were made as per the procedure of Experiment 1, and following the application, the plants were cultivated under the same conditions as Experiment 1 for 20 days. After 20 days, the degree of injury sustained by each plant was investigeted.

The degrees of injury were evaluated by the standard given in Experiment 1.

TABLE 2

| Compound (I) No. | Dosage (g/A) | Transplanted rice | Echinochloa | Ludwigia | Digitaria | Amaranthus |
|---|---|---|---|---|---|---|
| (1)  | 50  | 1 | 2 | 1 | 2 | 1 |
|      | 100 | 3 | 3 | 2 | 3 | 2 |
| (2)  | 50  | 2 | 3 | 2 | 1 | 2 |
|      | 100 | 3 | 3 | 3 | 3 | 3 |
| (3)  | 50  | 2 | 3 | 3 | 3 | 3 |
|      | 100 | 3 | 3 | 3 | 3 | 3 |
| (4)  | 50  | 2 | 2 | 1 | 2 | 3 |
|      | 100 | 3 | 3 | 2 | 3 | 3 |
| (5)  | 50  | 2 | 3 | 3 | 2 | 2 |
|      | 100 | 3 | 3 | 3 | 3 | 3 |
| (6)  | 50  | 2 | 2 | 2 | 2 | 2 |
|      | 100 | 3 | 3 | 3 | 3 | 3 |
| (7)  | 50  | 1 | 2 | 2 | 2 | 2 |
|      | 100 | 2 | 3 | 3 | 3 | 3 |
| (8)  | 50  | 1 | 2 | 1 | 2 | 1 |
|      | 100 | 2 | 3 | 2 | 3 | 2 |
| (9)  | 50  | 1 | 3 | 3 | 2 | 1 |
|      | 100 | 2 | 3 | 3 | 3 | 2 |
| (10) | 50  | 1 | 3 | 3 | 2 | 1 |
|      | 100 | 2 | 3 | 3 | 3 | 2 |
| (11) | 50  | 1 | 3 | 2 | 2 | 1 |
|      | 100 | 2 | 3 | 3 | 3 | 2 |
| (12) | 50  | 1 | 3 | 1 | 2 | 2 |
|      | 100 | 2 | 3 | 2 | 3 | 3 |
| (13) | 50  | 2 | 2 | 1 | 2 | 1 |
|      | 100 | 3 | 3 | 2 | 3 | 2 |
| (14) | 50  | 1 | 2 | 2 | 2 | 1 |
|      | 100 | 2 | 3 | 3 | 3 | 2 |
| (15) | 50  | 1 | 3 | 3 | 3 | 2 |
|      | 100 | 2 | 3 | 3 | 3 | 3 |
| (16) | 50  | 1 | 3 | 3 | 3 | 3 |
|      | 100 | 2 | 3 | 3 | 3 | 3 |
| (17) | 50  | 0 | 2 | 1 | 2 | 1 |
|      | 100 | 0 | 3 | 2 | 3 | 2 |
| (18) | 50  | 0 | 3 | 3 | 3 | 3 |
|      | 100 | 0 | 3 | 3 | 3 | 3 |
| (19) | 50  | 0 | 2 | 1 | 2 | 1 |
|      | 100 | 0 | 3 | 2 | 3 | 2 |
| (20) | 50  | 0 | 2 | 1 | 2 | 2 |
|      | 100 | 1 | 3 | 2 | 3 | 3 |
| (21) | 50  | 0 | 3 | 2 | 3 | 3 |
|      | 100 | 1 | 3 | 3 | 3 | 3 |
| (22) | 50  | 0 | 3 | 2 | 3 | 2 |
|      | 100 | 1 | 3 | 3 | 3 | 3 |
| (23) | 50  | 0 | 2 | 1 | 2 | 1 |
|      | 100 | 1 | 3 | 2 | 3 | 2 |
| (24) | 50  | 1 | 3 | 3 | 3 | 2 |
|      | 100 | 2 | 3 | 3 | 3 | 3 |
| (25) | 50  | 0 | 3 | 3 | 3 | 2 |
|      | 100 | 1 | 3 | 3 | 3 | 3 |
| (26) | 50  | 0 | 3 | 1 | 2 | 1 |
|      | 100 | 1 | 3 | 2 | 3 | 2 |
| (27) | 50  | 1 | 3 | 1 | 2 | 1 |
|      | 100 | 2 | 3 | 2 | 3 | 2 |
| (28) | 50  | 1 | 2 | 1 | 1 | 1 |
|      | 100 | 2 | 3 | 2 | 3 | 2 |
| (29) | 50  | 1 | 2 | 1 | 1 | 1 |
|      | 100 | 2 | 3 | 2 | 3 | 2 |
| (30) | 50  | 1 | 3 | 2 | 2 | 2 |
|      | 100 | 2 | 3 | 3 | 3 | 3 |
| (31) | 50  | 1 | 3 | 3 | 2 | 2 |
|      | 100 | 2 | 3 | 3 | 3 | 3 |
| (32) | 50  | 1 | 2 | 2 | 2 | 1 |
|      | 100 | 2 | 3 | 3 | 3 | 2 |
| (33) | 50  | 3 | 3 | 0 | 1 | 1 |
|      | 100 | 3 | 3 | 2 | 3 | 3 |
| (34) | 50  | 1 | 1 | 0 | 0 | 0 |
|      | 100 | 2 | 3 | 2 | 2 | 1 |
| (35) | 50  | 3 | 3 | 2 | 2 | 0 |
|      | 100 | 3 | 3 | 3 | 3 | 2 |
| (36) | 50  | 1 | 2 | 2 | 1 | 2 |
|      | 100 | 2 | 3 | 3 | 3 | 3 |
| (37) | 50  | 3 | 3 | 3 | 2 | 0 |
|      | 100 | 3 | 3 | 3 | 3 | 2 |
| (38) | 50  | 2 | 3 | 2 | 2 | 1 |
|      | 100 | 3 | 3 | 3 | 3 | 2 |
| (39) | 50  | 1 | 3 | 2 | 2 | 2 |
|      | 100 | 2 | 3 | 3 | 3 | 3 |
| (40) | 50  | 2 | 3 | 3 | 2 | 2 |
|      | 100 | 3 | 3 | 3 | 3 | 3 |
| (41) | 50  | 3 | 2 | 3 | 0 | 1 |
|      | 100 | 3 | 3 | 3 | 2 | 3 |
| (42) | 50  | 3 | 3 | 0 | 2 | 0 |
|      | 100 | 3 | 3 | 2 | 3 | 2 |
| (43) | 50  | 2 | 3 | 2 | 0 | 0 |

TABLE 2 – Continued

| Compound (I) No. | Dosage (g/A) | Transplanted rice | Echinochloa | Ludwigia | Digitaria | Amaranthus |
|---|---|---|---|---|---|---|
| (44) | 100 | 3 | 3 | 3 | 2 | 1 |
| | 50 | 3 | 3 | 3 | 2 | 0 |
| (45) | 100 | 3 | 3 | 3 | 3 | 2 |
| | 50 | 3 | 3 | 2 | 1 | 0 |
| (46) | 100 | 3 | 3 | 3 | 2 | 2 |
| | 50 | 3 | 3 | 2 | 1 | 2 |
| (47) | 100 | 3 | 3 | 3 | 3 | 3 |
| | 50 | 2 | 3 | 2 | 1 | 0 |
| (48) | 100 | 3 | 3 | 3 | 2 | 2 |
| | 50 | 2 | 2 | 3 | 0 | 1 |
| (49) | 100 | 3 | 3 | 3 | 2 | 2 |
| | 50 | 3 | 2 | 3 | 0 | 0 |
| (50) | 100 | 3 | 3 | 3 | 2 | 2 |
| | 50 | 2 | 3 | 2 | 1 | 0 |
| (51) | 100 | 3 | 3 | 3 | 3 | 2 |
| | 50 | 2 | 2 | 0 | 1 | 0 |
| (52) | 100 | 3 | 3 | 2 | 3 | 1 |
| | 50 | 2 | 3 | 2 | 0 | 0 |
| (53) | 100 | 3 | 3 | 3 | 2 | 2 |
| | 50 | 1 | 1 | 2 | 0 | 0 |
| (54) | 100 | 2 | 3 | 3 | 2 | 1 |
| | 50 | 0 | 0 | 2 | 0 | 0 |
| | 100 | 1 | 2 | 2 | 1 | 1 |

EXPERIMENT 3

1/2,000-Are Wagner's pots were planted with rice plants with four–five leaves (variety: Manryo), six plants to each pot. Each of those same pots was also sown with *Echinochloa crus-galli*, *Cyperus difformis* L. and *Morochoria vaginalis* Presl and planted with a 5 cm-rhizome of *Eleocharis acicularis* Roem. et Schult. In 10 day after sowing or transplanting, each pot was irrigated to a constant water depth of 3 cm, and granules composed of 3 percent compound (I) 0.7 percent compound (II) and the balance of bentonite were uniformly applied to the water in each pot at the rate of 300 g/are. 20 days after the application of the granules, the herbicidal activity of these granules were measured. The results are set forth in Table 3.

TABLE 3

| Compound (I) No. | Compound (II) No. | Transplanted rice | Echinochloa | Cyperus | Monochoria | Eleocharis |
|---|---|---|---|---|---|---|
| (2) | — | 0 | 1 | 1 | 1 | 1 |
| (5) | — | 0 | 2 | 2 | 1 | 1 |
| (14) | — | 0 | 2 | 2 | 2 | 1 |
| (16) | — | 0 | 2 | 1 | 1 | 1 |
| (18) | — | 0 | 1 | 1 | 1 | 1 |
| (35) | — | 0 | 2 | 1 | 1 | 1 |
| (37) | — | 0 | 1 | 2 | 2 | 1 |
| (40) | — | 0 | 1 | 1 | 1 | 1 |
| (42) | — | 0 | 2 | 2 | 1 | 1 |
| (45) | — | 0 | 1 | 1 | 1 | 1 |
| — | (A) | 0 | 1 | 2 | 2 | 1 |
| — | (B) | 0 | 1 | 2 | 2 | 0 |
| — | (C) | 0 | 1 | 2 | 2 | 2 |
| — | (D) | 0 | 1 | 1 | 2 | 0 |
| — | (E) | 0 | 1 | 2 | 1 | 1 |
| — | (F) | 0 | 1 | 2 | 2 | 1 |
| (2) | (A) | 1 | 3 | 3 | 3 | 3 |
| (2) | (B) | 1 | 3 | 3 | 3 | 3 |
| (2) | (F) | 0 | 3 | 3 | 3 | 2 |
| (5) | (C) | 0 | 3 | 3 | 3 | 3 |
| (5) | (E) | 1 | 3 | 3 | 3 | 3 |
| (5) | (F) | 1 | 3 | 3 | 3 | 2 |
| (14) | (C) | 1 | 3 | 3 | 3 | 2 |
| (14) | (D) | 0 | 2 | 3 | 3 | 2 |
| (14) | (F) | 1 | 3 | 3 | 3 | 2 |
| (16) | (C) | 1 | 3 | 3 | 3 | 3 |
| (16) | (D) | 0 | 3 | 3 | 3 | 2 |
| (16) | (E) | 0 | 3 | 3 | 3 | 2 |
| (18) | (B) | 0 | 3 | 3 | 3 | 2 |
| (18) | (C) | 0 | 3 | 3 | 3 | 3 |
| (18) | (F) | 0 | 3 | 3 | 3 | 2 |
| (35) | (A) | 0 | 3 | 3 | 3 | 3 |
| (35) | (B) | 0 | 3 | 3 | 3 | 3 |
| (35) | (E) | 0 | 3 | 3 | 3 | 2 |
| (37) | (B) | 0 | 3 | 3 | 3 | 2 |
| (37) | (D) | 0 | 3 | 3 | 3 | 2 |
| (37) | (E) | 1 | 3 | 3 | 3 | 2 |
| (40) | (A) | 0 | 3 | 3 | 3 | 2 |
| (40) | (E) | 0 | 3 | 3 | 3 | 2 |
| (40) | (F) | 0 | 3 | 3 | 3 | 2 |
| (42) | (A) | 1 | 3 | 3 | 3 | 3 |
| (42) | (B) | 0 | 3 | 3 | 3 | 2 |
| (42) | (F) | 0 | 3 | 3 | 3 | 2 |
| (42) | (B) | 0 | 3 | 3 | 3 | 2 |
| (45) | (C) | 0 | 3 | 3 | 3 | 3 |
| (45) | (D) | 0 | 2 | 3 | 3 | 2 |

EXPERIMENT 4

*Digitaria adscendens* Henr. [plant(10–20 cm high)], *Setaria viridis* Beauvois (15–20 cm), *Polygonum blumei* Meisner (stem height 35–40 cm), and *Chenopodium album* L. var. centrorubrum Makino (stem height 35–40 cm) were cultivated in concrete pots with 1 m² in area, and the spray solutions prepared by the similar manner as Experiment 1 employing the compound (I) and/or (III) as active ingredient(s) (when the compound (I) or (III) is the sole active ingredient, its amount to be contained is 48g/are, respectively, while both compounds are used as the active ingredients, the respective amounts of compounds (I) and compound (III) to be contained are 40g/are and 8g/are) were applied to the entire foliages of the plants (2 replicates). 3 weeks after the treatment, top fresh weight of each weed was weighed and the average of two replicates was taken.

The results are set forth in Table 4.

Table 4

| Compound | | Fresh weight | | | |
|---|---|---|---|---|---|
| (I) No. | (III) No. | Digitaria Fresh weight (g/pot) | Setaria Fresh weight (g/pot) | Polygonum Fresh weight (g/pot) | Chenopodium Fresh weight (g/pot) |
| 1 | — | 164 | 124 | 296 | 492 |
| 2 | — | 110 | 108 | 220 | 447 |
| 3 | — | 98 | 85 | 218 | 386 |
| 13 | — | 171 | 131 | 305 | 483 |
| 39 | — | 167 | 115 | 343 | 470 |
| 43 | — | 178 | 128 | 350 | 485 |
| 46 | — | 159 | 110 | 308 | 466 |
| 53 | — | 177 | 122 | 377 | 498 |
| — | (A') | 70 | 66 | 77 | 101 |
| — | (B') | 125 | 111 | 196 | 294 |
| 1 | (A') | 14 | 0 | 48 | 77 |
| 1 | (B') | 23 | 26 | 171 | 198 |
| 2 | (A') | 6 | 0 | 0 | 48 |
| 3 | (B') | 19 | 15 | 133 | 138 |
| 13 | (A') | 24 | 25 | 38 | 87 |
| 39 | (B') | 21 | 18 | 115 | 109 |
| 43 | (A') | 17 | 19 | 28 | 53 |
| 46 | (A') | 18 | 22 | 30 | 47 |
| 46 | (B') | 43 | 42 | 132 | 177 |
| 53 | (A') | 31 | 26 | 55 | 35 |
| — | — | 175 | 134 | 375 | 493 |

EXPERIMENT 5

1/5,000-Are Wagner's pots were sown with *Echinochloa crus-galli* Beauv. var. oryzicola Ohwi, 30 seeds per pot, and the plants were cultivated under the submerged condition(3 cm depth) until they reached the three-leaf stage. Separately, the rhizomes of *Eleochalis acicularis* R. et S., *Cyperus serotinus* Rottb. and *Potamogeton distinctus* A. Benn. were transplanted to pots, one species to each pot and five rhizomes per pot. Under a 3 cm-deep cover of water, the plants were cultivated until the plant heights of Eleochalis, Cyperus and Potamogeton reached 3 cm (spread all over the pot), 10 cm and 15 cm, respectively. Further separately, rice was transplanted to pots at the rate of six plants per pot. When the weeds reached those predetermined growing stages and 10 days after the transplantation of rice, the granules prepared below were applied to the weeds under submerged conditions, at the rate of 300 g. granules per are. The granules contained 4 percent of a compound (I) and 1 percent of a compound (IV) or a compound (V) or 4 percent of compound (I) or 1 percent of a compound (IV) or (V), separately, with bentonite making up for the balance in each instance. 4 weeks after application of the granules, top fresh weight of each surviving weed was weighed alive and the herbicidal activity of each granular composition was calculated by means of the following equation. The experimental design comprised three replicates.

Rate of inhibition
= [1 − (Fresh weight of treated plant/Fresh weight of control plant)] × 100 (percent)

The results are set forth in Table 5.

TABLE 5

| | | | Rate of inhibition (%) | | | |
|---|---|---|---|---|---|---|
| Compound (I) No. | Compound (IV) No. or (V) No. | Transplanted rice | Echinochloa | Eleocharis | Cyperus | Potamogeton |
| (12) | — | 0 | 22 | 15 | 0 | 0 |
| (14) | — | 0 | 39 | 23 | 0 | 7 |
| (15) | — | 0 | 37 | 35 | 3 | 4 |
| (17) | — | 0 | 18 | 30 | 0 | 0 |
| (18) | — | 0 | 25 | 19 | 4 | 6 |
| (19) | — | 0 | 29 | 18 | 7 | 5 |
| (23) | — | 0 | 20 | 11 | 7 | 8 |
| (35) | — | 0 | 34 | 22 | 3 | 11 |
| (46) | — | 0 | 30 | 27 | 14 | 5 |
| — | (d) | 0 | 27 | 24 | 8 | 43 |
| — | (e) | 7 | 24 | 18 | 10 | 52 |
| — | (h) | 11 | 14 | 20 | 9 | 50 |

TABLE 5—Continued

| Compound (I) No. | Compound (IV) No. or (V) No. | Transplanted rice | Rate of inhibition (%) | | | |
|---|---|---|---|---|---|---|
| | | | Echinochloa | Eleocharis | Cyperus | Potamogeton |
| — | (f') | 0 | 0 | 13 | 0 | 21 |
| — | (g') | 0 | 0 | 12 | 0 | 47 |
| — | (h') | 0 | 4 | 10 | 0 | 25 |
| — | (i') | 0 | 5 | 16 | 0 | 39 |
| (14) | (d) | 2 | 100 | 100 | 54 | 98 |
| (14) | (h) | 8 | 100 | 100 | 60 | 79 |
| (15) | (d) | 0 | 100 | 100 | 77 | 97 |
| (17) | (d) | 0 | 94 | 100 | 52 | 67 |
| (17) | (h) | 7 | 90 | 100 | 50 | 66 |
| (18) | (d) | 0 | 100 | 100 | 71 | 84 |
| (18) | (e) | 9 | 100 | 100 | 69 | 89 |
| (18) | (h) | 7 | 100 | 100 | 58 | 90 |
| (19) | (d) | 0 | 100 | 100 | 68 | 85 |
| (23) | (d) | 0 | 100 | 100 | 60 | 79 |
| (23) | (h) | 11 | 100 | 100 | 53 | 81 |
| (35) | (h) | 17 | 100 | 100 | 55 | 75 |
| (35) | (d) | 8 | 100 | 100 | 63 | 69 |
| (46) | (e) | 0 | 100 | 100 | 66 | 88 |
| (46) | (h) | 3 | 100 | 100 | 65 | 73 |
| (14) | (h') | 7 | 100 | 100 | 56 | 60 |
| (14) | (i') | 0 | 100 | 100 | 58 | 84 |
| (15) | (i') | 0 | 100 | 100 | 52 | 86 |
| (18) | (g') | 0 | 100 | 100 | 64 | 85 |
| (18) | (i') | 0 | 100 | 100 | 59 | 90 |
| (19) | (i') | 0 | 100 | 100 | 55 | 85 |
| (23) | (g') | 0 | 100 | 100 | 60 | 88 |
| (35) | (i') | 0 | 100 | 100 | 60 | 83 |
| (46) | (i') | 0 | 100 | 100 | 60 | 85 |

EXPERIMENT 6

1/5,000-Are Wagner's pots were sown with *Digitaria adscendens* Henr., *Portulaca oleracea* L., *Chenopodium album* L. var. centrorubrum Makino, *Alopecurus aequalis* Sobol. var. amurensis Ohwi. and *Stellaria media* Cyr., respectively, 50 seeds were covered with soil to 1 cm thick, the pots were irrigated to such a degree that the surface layer of the soil was barely moistened, and were evenly sprayed with the following suspensions at the rate of 2 ml. per pot. Thus 30 percent of each compound of the above mentioned general formula (I), 6 percent of each compound of the general formula (IV) or (V), 5 percent sodium lignosulfonate, 5 percent polyoxyethylene alkylaryleter and 54 percent clay were mixed together and comminuted to prepare a wettable powder. On the other hand, compounds of general formula (I) (IV) and (V), 30 percent, 5 percent, and 6 percent, respectively, were each mixed with 5 percent sodium lignosulfonate, 5 percent polyoxyethylene alkylarylether and the balance of clay, i.e., 60 percent, 84 percent and 84 percent, respectively, and the resulting mixtures were comminuted to prepare wettable powders. Each of those wettable powders was suspended in water at the rate of 25 g. to 10 litres water. One month after the treatment, the top fresh weight of each surviving plant was measured and the rate of inhibition was calculated in the same manner as Experiment 2. The experiment was replicated three times. The experiment on Alopecurus and Stellaria was conducted in early spring and that on the other weeds was carried out in early summer.

The results are set forth in Table 6.

TABLE 6

| Compound (I) No. g/are | Compound (IV) No. or (V) No. g/are | Rate of inhibition (%) | | | | |
|---|---|---|---|---|---|---|
| | | Digitaria | Portulaca | Chenopodium | Alopecurus | Stellaria |
| (2) | — | 47 | 8 | 28 | 44 | 44 |
| (3) | — | 33 | 15 | 17 | 34 | 22 |
| (14) | — | 54 | 9 | 35 | 28 | 60 |
| (38) | — | 50 | 10 | 40 | 27 | 48 |
| — | (a) | 35 | 36 | 52 | 25 | 68 |
| — | (b) | 23 | 22 | 43 | 17 | 62 |
| — | (h) | 10 | 10 | 31 | 21 | 46 |
| — | (d') | 37 | 42 | 60 | 41 | 70 |
| — | (e') | 25 | 30 | 53 | 23 | 58 |
| — | (g') | 27 | 36 | 58 | 35 | 60 |
| — | (h') | 24 | 29 | 61 | 20 | 66 |
| — | (i') | 28 | 33 | 53 | 30 | 59 |
| (2) | (b) | 100 | 100 | 100 | 100 | 100 |
| (2) | (h) | 96 | 100 | 100 | 100 | 100 |
| (3) | (a) | 100 | 100 | 100 | 100 | 100 |
| (14) | (a) | 100 | 100 | 100 | 100 | 100 |
| (14) | (h) | 100 | 100 | 100 | 100 | 100 |
| (38) | (b) | 100 | 100 | 100 | 100 | 100 |
| (2) | (d') | 100 | 100 | 100 | 100 | 100 |
| (2) | (e') | 100 | 100 | 100 | 100 | 100 |
| (2) | (i') | 100 | 100 | 100 | 100 | 100 |
| (3) | (d') | 100 | 100 | 100 | 100 | 100 |
| (14) | (h') | 100 | 100 | 100 | 100 | 100 |
| (14) | (i') | 100 | 100 | 100 | 100 | 100 |
| (38) | (g') | 100 | 100 | 100 | 100 | 100 |

EXPERIMENT 7

Concrete pots, 60 by 60 cm$^2$, installed outdoors, were filled with paddy-field soil and then were sown with 50 seeds of Echinochloa crus-galli (L.) Beauv. var. oryzicola Ohwi. Then, Oryza sativa L. (the average height is 16.5 cm and the average number of leaves is 3.9) were transplanted to the above pots, at the rate of 16 plants per pot. And a constant amount of mixture of weeds of Monochoria vaginalis Presl, Cyperus microiria Steudel, Lindernia pyxidaria L., were mix-sown to the above pots. When the average height of Oryza sativa L. reached 23.4 cm and the average number of the leaves is 6 and when the average height of Echinochloa reached 19.5 cm and the average number of the leaves is 3.8, the granules prepared below were applied to the weeds covered with water at a depth of 5 cm. The granules contained one or more of 7 percent of 2-(2-chlorobenzylthio)-5-( n-propyl)-1,3,4-oxadiazole, 1.5 percent of 2-methylthio-4,6-bis(ethylamino)-1,3,5-triazine and 1.5 percent of 3 (3-chloro-4-bromophenyl)-1-methyl-1-methoxyurea, separately with bentonite making up for the balance in each instance. The same depth of water was kept for a week after applying the granules. A month after the treatment, the plants were weighed alive and the average of each three replicates was taken. The results are shown in Table 7.

Examples of the invention include:

Example 1

A dust prepared by blending 2 percent of 2-benzylthio-5-methyl-1,3,4-oxadiazole with 98 percent of talc.

Example 2

An emulsifiable solution prepared by mixing 20 percent of 2-(2-chlorobenzylthio)-5-(n-propyl)-1,3,4-oxadiazole, 10 percent of polyoxyethylenealkylarylether and 70 percent of methylnaphthalene.

Example 3

A wettable powder prepared by mixing and comminuting 20 percent of 2-(2-bromobenzylthio)-5-ethyl-1,3,4-thiadiazole, 4 percent of sodium lignosulfonate, 4 percent of polyoxyethylene alkylarylether and 72 percent of clay.

Example 4

An emulsifiable solution prepared by mixing and dissolving 20 percent of 2-(2-chlorobenzylthio)-5-(n-propyl)-1,3,4-thiadiazole, 4 percent of 3,4-dichloropropionanilide, 10 percent of polyoxyethylenealkyl-arylether and 5 percent of methylnaphthalene.

Example 5

A granular composition prepared by kneading a mixture of 3 percent of 2-(4-chlorobenzylthio)-5-methyl-1,3,4-oxadiazole, 0.7 percent of 2-methyl-4-chlorophenoxyacetic ethylester and 96.3 percent of bentonite with water and granulating the resulting mass.

Example 6

A wettable powder prepared by mixing and comminuting 30 percent of 2-(2-chlorobenzylthio)-5-ethyl-1,3,4-oxadiazole, 6 percent of 3-(3-chloro-4-bromophenyl)-1-methyl-1-methoxyurea, 5 percent of polyoxyethylene alkylarylether and 54 percent of clay.

Example 7

A granular composition prepared by mixing and granulating 5 percent of 2-(2-chlorobenzylthio)-5-ethyl-1,3,4-oxadiazole, 1.5 percent of 2-methylthio-4,6-bis(ethylamino)-1,3,5-triazine and 93.5 percent of bentonite.

Example 8

A granular composition prepared by mixing and granulating 5 percent of 2-(4-chlorobenzylthio)-5-ethyl-1,3,4-thiadiazole, 1.5 percent of 2-methylthio-4,6-bis(ethylamino) 1,3,5-triazine and 93.5 percent of bentonite.

Example 9

A granular composition prepared by mixing and granulating 5 percent of 2-(2-chlorobenzylthio)-5-($n$-propyl)-1,3,4-oxadiazole, 0.7 percent of 2-methyl-4-chlorophenoxy acetic acid, 1.5 percent of 3-(3-chloro-4-bromophenyl)-1-methyl-1-methoxyurea, 5 percent of sodium lignosulfate and 87.8 percent of bentonite.

What is claimed is:

1. A herbicidal composition which comprises, as the active ingredient, a herbicidally effective amount of (A) a compound of the formula

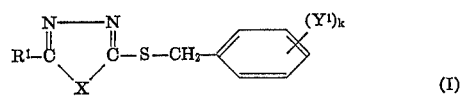

(I)

wherein $R^1$ is hydrogen or alkyl of one to nine carbon atoms, X is oxygen or sulfur, $Y^1$ is halogen, lower alkyl, lower alkoxy or nitro, and $k$ is zero or an integer from 1 to 5 and (B) a compound of the formula

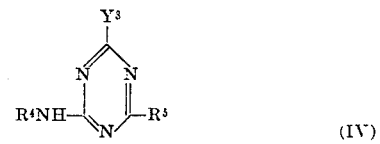

(IV)

wherein $Y^3$ is chlorine or lower alkylthio, $R^4$ is lower alkyl, and $R^5$ is azido or lower alkylamino, the ratio of A:B being 1.0:0.1–1.0.

2. A herbicidal composition claimed in claim 1, wherein the compound of formula (I) is 2-(2-chlorobenzylthio)-5-($n$-propyl)-1,3,4-oxadiazole and the compound of formula (IV) is 2-methylthio-4,6-bis(ethylamino)-1,3,5-triazine.

3. A herbicidal composition claimed in claim 1, wherein the compound of formula (I) is 2-(2-chlorobenzylthio)-5-ethyl-1,3,4-oxadiazole and the compound of formula (IV) is 2-methylthio-4,6-bis(ethylamino)-1,3,5-triazine.

4. A method for destroying dicotyledonous and monocotyledonous weeds which comprises applying to an area infested with such weeds or weed seeds a composition according to claim 1.

* * * * *